Aug. 14, 1951 M. J. STOLAROFF 2,563,882
MAGNETIC RECORDING SYSTEM
Original Filed Dec. 27, 1948
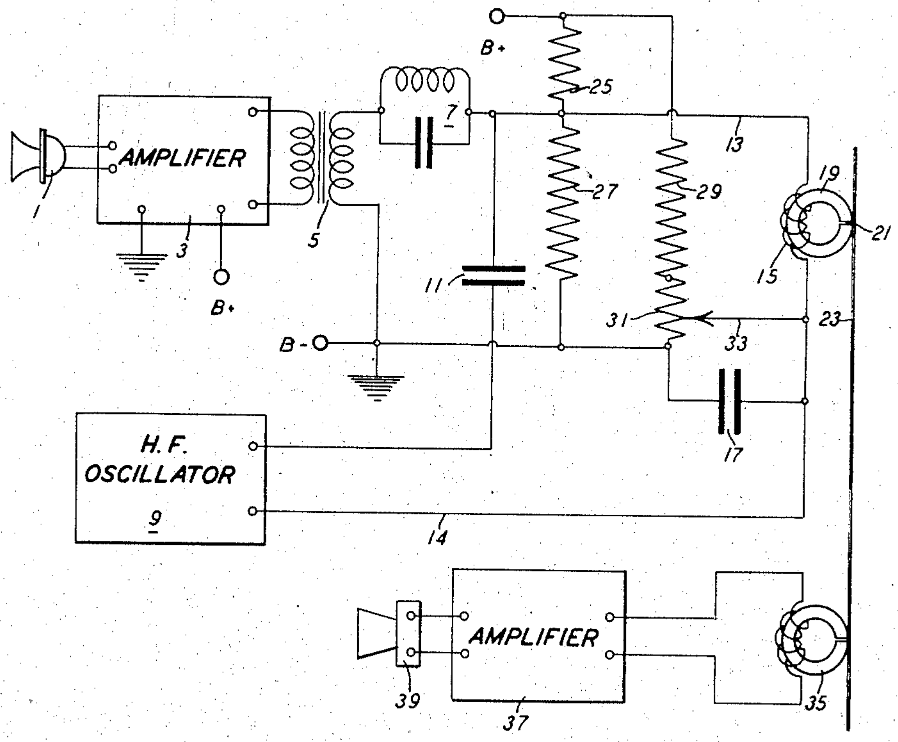
INVENTOR
MYRON J. STOLAROFF.
BY
Lippincott & Smith.
ATTORNEYS Patented Aug. 14, 1951

2,563,882

UNITED STATES PATENT OFFICE 2,563,882

MAGNETIC RECORDING SYSTEM

Myron J. Stolaroff, San Carlos, Calif., assignor to Ampex Electric Corporation, San Carlos, Calif., a corporation of California Original application December 27, 1948, Serial No. 67,278. Divided and this application November 24, 1950, Serial No. 197,323

3 Claims. (Cl. 179—100.2)

This application constitutes a division of application Serial No. 67,278, filed December 27, 1948, for an invention entitled Magnetic Recording System, by this applicant and John T. Mullin.

This invention relates to magnetic recording of sound or other impulses; i. e., to the making of phonographic records by variably magnetizing a moving magnetic material such as wire, tape, or the like. Among the objects of the invention are: to provide a system of recording which reduces the residual noise upon the record; to provide a system which increases the dynamic range which can be imposed upon the record; to provide a method of recording whereby high coercive force magnetic materials may be used without increasing the ratio of noise to signal in comparison with that obtainable with low coercive force materials; and to provide a method which will accomplish the above-mentioned ends in a simple, easy and economical manner.

All systems of magnetic recording operate by moving the magnetizable recording medium past a recording head or heads, the head comprising a coil which carries electric currents of frequency corresponding to the sound to be recorded and provided with a ferro-magnetic core having pole pieces spaced a minute distance apart and so apposed to the recording medium that an elementary portion thereof is subjected to the magnetic field induced in the core.

It was early discovered that the quality of the recording was greatly improved by magnetically biasing the recording head. In the earliest recorders of this character D.-C. bias was used; i. e., the recording head carried, in addition to currents of the frequencies to be recorded, a direct current component. Sometimes, in place of the D.-C. bias, an equivalent result was obtained by the use of a permanent magnet setting up a unidirectional magnetic field in the recording medium.

Later, it was discovered that a much better quality of recording could be obtained if, in place of the D.-C. bias, a high-frequency or ultrasonic bias was used. Various methods have been devised of applying the ultrasonic bias, but all operate upon the principle that the ultrasonic frequency carries the magnetic material to which it is applied through a number of cycles of magnetization for each cycle of the frequency to be recorded. Satisfactory materials for this type of recording all have a relatively high hysteresis; in fact, the ability to attain the magnetic record depends upon this fact. It follows from this that the degree of polarization produced in the medium when it is subjected to a magnetic field of a given strength depends upon the previous magnetic history of the material, i. e., upon whether the field to which it is subjected is an increase or a decrease with respect to what has occurred to it in the past. Where a high-frequency biasing field is used, superimposed upon the recording field, there will be portions of the medium in each cycle of the recorded wave which have approached the desired degree of magnetization from both lower and higher degrees, and the result will be an average degree of magnetization which accurately represents that which it was desired to record. As a result, with high-frequency biasing, a freedom from distortion is obtainable which cannot be achieved in other manners, and all high quality magnetic recording systems now use high-frequency bias, and the older D.-C. bias has become a thing of the past.

The use of high-frequency bias not only improved the quality of the recording, but also greatly decreased the "noise" on the record. Record noise is due to random polarizations on the record; where the recording amplitude is high it is not noticeable, but in extremely soft passages, or in intervals of "silence," it can become very noticeable and can obtrude upon the listeners in such manner as to make the result highly unpleasant, particularly in the recording of music or entertainment where high quality is important.

In recording for such uses an extremely important factor is the "dynamic range" of the record. This range may be defined roughly as the difference in amplitude between the minimum signal which will mask the noise and the maximum signal which can be recorded without distortion. The dynamic range for even the best recording media is less than that ordinarily available in many types of original production. This is particularly the case in the recording of orchestral music, wherein the range of energy between the softest and the loudest passages may be as much as 90 db., or a billion to one. The range of the best recording media is approximately one thousand times less than this, or about a million to one. Every effort is made, therefore, to increase the dynamic range.

Some of the highest quality recording media that have been developed consist of iron oxides, finely powdered and applied as a coating to cellulose or paper tape. Media of this character can be classified as "high coercive force" media, wherein the oxides used are basically magnetite or $Fe_3O_5$, and "low coercive force" media wherein the oxides used are basically hematite or $Fe_2O_3$.

High coercive media will retain a much stronger polarization than the low, requiring less amplification. In general, however, the low coercive media have a relatively lower noise level, so that their dynamic range is frequently greater than that of the other type. To reduce the residual noise level on the high coercive media to something approximating that of the others is therefore a highly desirable procedure, as it increases the dynamic range by the number of db. by which the noise level is reduced.

Considered broadly, the recording system of my invention comprises the imposition upon the magnetic medium, during the recording, of an extremely small D.-C. bias in addition to the now conventional high-frequency bias. The D.-C. bias used is less than that which was conventional before the discovery of the now usual high-frequency biasing system; the value of bias used is critical, but when adjusted properly it will reduce the noise level as much as 10 db. below that which obtains when the auxiliary D.-C. bias is not used. The use of such bias is directly contrary to present practice, since it has been known since the advent of high-frequency biasing that a direct polarization ordinarily increases noise. The exact reason why the effect takes place is not known, although it is believed that it may be due to a bucking out of some other continuous component of magnetization which is inherent in the apparatus used. It has been found, however, that once the value of D.-C. bias for minimum noise level is attained, the adjustment remains constant for long periods.

A preferred method of practicing the invention is illustrated in the single figure of the drawing, which is a schematic diagram of the equipment.

Referring to the drawing, the original sound to be recorded is picked up by a suitable microphone 1 and amplified in the usual manner in a conventional amplifier 3. This amplifier is shown as feeding a current transformer 5, to the secondary coil of which the recording circuit is connected. This circuit comprises a tuned choke or anti-resonant circuit 7, which is tuned to the frequency of the high-frequency or ultrasonic oscillator 9, the function of the choke being to prevent the high-frequency oscillations from passing back through the transformer secondary. The oscillator is connected into the circuit just beyond the tuned choke 7, through a blocking condenser 11 and lines 13 and 14, and across the coil 15 of the recording head. The audio-frequency circuit of the latter extends through lead 13, coil 15, thence through a by-pass condenser 17, and so to the low side of the transformer secondary and ground.

The recording head which is preferably used comprises a core of magnetic material of high permeability and low retentivity 19 which forms a nearly complete loop, being interrupted only by a gap 21 which is preferably only of the order of $\frac{2}{1000}$ of an inch long and is preferably filled with a sheet of high conductive material, such as beryllium-copper, which deflects the magnetic field out through the tape or other recording medium 23. This is one of the conventional types of head, and is shown for illustration, since the method is operative with other types.

The D.-C. component of current which is the heart of this invention is conveniently supplied from the same source of power which excites the power circuits of the amplifier 3. It is applied through a bridge circuit, comprising a high-resistance element 25, e. g., 1 megohm, connected to the positive terminal of the power supply (B+) and to the lead 13 leading to the recording head. The second arm 27 of the bridge circuit connects from the lead 13 to B— and ground. It is of lower resistance than the element 25, perhaps 2,500 ohms, but still high in comparison to the impedance of the recording head which may have a maximum value of 600 ohms; preferably at least one order of magnitude greater.

The other two arms of the bridge comprise a resistor 29 in series with a potentiometer 31. The values of these resistors are so chosen that when the contact arm 33 is at approximately the mid point of the potentiometer, its D.-C. potential will be the same as that of the lead 13. The cross arm or diagonal branch of the bridge comprises the lead 13, the recording coil 15, and the bridge adjustment contactor 33. The values of the various bridge arms are subject to wide variation, depending upon the potential of the power supply B+, the impedance of the recording head, and the various other obvious design criteria, such as the conveniently available potentiometer values.

The potentiometer 31 may have a total value of say, 1,000 ohms, and the resistor 29 a resistance of 20,000 ohms, but if more power is available both values may be lower. If the resistance of potentiometer 31 is small, by-pass condenser 17 for carrying the audio frequency can be omitted. It should be obvious that one of the principal reasons for using the relatively high voltage of the power supply to provide very low D.-C. biasing voltage and current is that it offers a ready means for doing this without material by-passing of the recording frequencies.

In adjusting the device, the tape or other recording medium 23 is threaded in the recorder in the usual manner, the high-frequency oscillator 9 is turned on, and the reproducing system comprising the pickup head 35, amplifier 37 and loudspeaker 39 are simultaneously turned on. The microphone 1, however, is disconnected or shut off. The reproducing system is set to maximum gain, and will then reproduce only the residual noise carried by the recording medium. Potentiometer arm 33 is then adjusted until this is a minimum. An average value of D.-C. bias so supplied may be 1 m. a. in the equipment here described, as compared to 5 m. a. of high-frequency bias. The direction of flow may be in either direction.

Once made the adjustment is relatively permanent, at least as long as the same type of recording medium is used. While it should be checked from time to time (say once a week), experience has shown that it seldom needs readjustment.

The system is usable with magnetic recorders and media of all types. It finds its highest usefulness in connection with the high coercive force media, whether wire, disk, or oxide tape. When used with low-coercive tapes, the value is not so great, since the noise on these tapes is so low in any event that the same reduction in tape noise may carry it to so low a level as not to be perceptible above tube noise at the amplifications used. Where high coercive media are used, however, the over-all noise reduction obtainable by applying the D.-C. bias may be as high as 10 db. or more, bringing it into the same general level as that of the low coercive tapes. Since the maximum distortionless range that can be recorded on the high-coercive tapes is much greater than that obtainable with the low, the over-all result may be as much as 10 db. increase in dynamic range of the equipment.

It will be recognized by those skilled in the art that there are other means of applying a minute D.-C. bias of the type here contemplated. That shown is convenient in that it offers a ready means of reversing the direction of the bias, so as to make it applicable to all situations, without switching or reversal of connections, and also without use of other power supplies than those that are otherwise necessary. I therefore desire to cover my invention as broadly as is possible within the scope of the following claims.

What is claimed is:

1. A magnetic recording system comprising a magnetic recording head, a source of current of the frequencies to be recorded connected to said head, a source of ultrasonic biasing frequency current also connected to said head, a source of direct current, and adjustable connections from said direct current source to said head for supplying thereto a direct component of current of a magnitude small in comparison with the current supplied from said ultrasonic source, said connections comprising a bridge circuit having a diagonal branch including said head, and arms having a resistance high in comparison to the impedance of said head.

2. A magnetic recording system in accordance with claim 1 wherein said source of current of frequencies to be recorded is connected across the diagonal branch of said bridge including said head and said direct current source is connected across the opposite diagonal of said bridge.

3. A magnetic recording system in accordance with the next preceding claim including means for adjusting said bridge to unbalance the same in either direction with respect to direct current so as to cause such direct current to flow in either direction in the diagonal branch including said recording head.

MYRON J. STOLAROFF.

No references cited.